(12) United States Patent
Hu et al.

(10) Patent No.: US 10,134,143 B2
(45) Date of Patent: Nov. 20, 2018

(54) METHOD FOR ACQUIRING RETINA STRUCTURE FROM OPTICAL COHERENCE TOMOGRAPHIC IMAGE AND SYSTEM THEREOF

(71) Applicant: Shenzhen Institutes of Advanced Technology, Shenzhen, Guangdong (CN)

(72) Inventors: Qingmao Hu, Guangdong (CN); Tianqiao Zhang, Guangdong (CN)

(73) Assignee: SHENZHEN INSTITUTES OF ADVANCED TECHNOLOGY, Shenzhen, Guangdong (CN)

(*) Notice: Subject to any disclaimer, the term of this patent is extended or adjusted under 35 U.S.C. 154(b) by 0 days.

(21) Appl. No.: 15/412,838

(22) Filed: Jan. 23, 2017

(65) Prior Publication Data

US 2017/0132793 A1  May 11, 2017

Related U.S. Application Data

(63) Continuation of application No. PCT/CN2016/085975, filed on Jun. 16, 2016.

(30) Foreign Application Priority Data

Aug. 31, 2015  (CN) .......................... 2015 1 0546478

(51) Int. Cl.
*G06K 9/00*   (2006.01)
*G06T 7/12*   (2017.01)
(Continued)

(52) U.S. Cl.
CPC .................. *G06T 7/12* (2017.01); *G06T 5/20* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS

2007/0263227 A1* 11/2007 Mujat ................ A61B 3/102
356/511
2011/0242484 A1  10/2011 Furukawa et al.
2012/0195481 A1   8/2012 Gonzalez Penedo et al.

FOREIGN PATENT DOCUMENTS

CN    102436651    5/2012
CN    103514605    1/2014

OTHER PUBLICATIONS

International Search Report, issued in the corresponding PCT application No. PCT/CN2016/085975, dated Sep. 19, 2016, 6 pages.

\* cited by examiner

*Primary Examiner* — Idowu O Osifade
(74) *Attorney, Agent, or Firm* — Hamre, Schumann, Mueller & Larson, P.C.

(57) ABSTRACT

The present disclosure provides a method for acquiring a retina structure from an optical coherence tomographic image and a system thereof. The method comprises: calculating a region of interest (ROI) image of a source image; performing a Gaussian filtering of the ROI image; calculating a first estimated boundary position of a first layer boundary and a second estimated boundary position of a second layer boundary using a multi-resolution method; refining the first layer boundary and the second layer boundary respectively using a simplified active contour model according to the first estimated boundary position and the second estimated boundary position, to obtain a first initial boundary position of the first layer boundary and a second initial boundary position of the second layer boundary; smoothing the first initial boundary position and the second
(Continued)

initial boundary position using a filtering method; acquiring segmentation positions of rest layer boundaries in the ROI image according to a segmented position of the first layer boundary and a segmented position of the second layer boundary. The present disclosure can improve the calculation speed and reduce the calculation complexity while maintaining high location accuracy.

8 Claims, 12 Drawing Sheets

(51) Int. Cl.
  *G06T 7/11* (2017.01)
  *G06T 5/20* (2006.01)
  *G06T 7/00* (2017.01)
  *G06T 7/149* (2017.01)
(52) U.S. Cl.
  CPC .... *G06T 7/149* (2017.01); *G06T 2207/10101* (2013.01); *G06T 2207/20016* (2013.01); *G06T 2207/20024* (2013.01); *G06T 2207/20104* (2013.01); *G06T 2207/20116* (2013.01); *G06T 2207/30041* (2013.01)

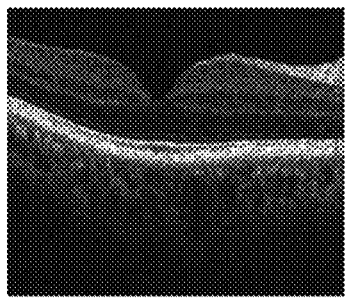 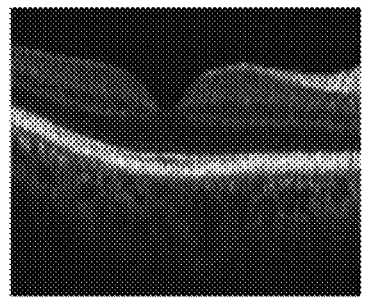
Fig.5   Fig.6
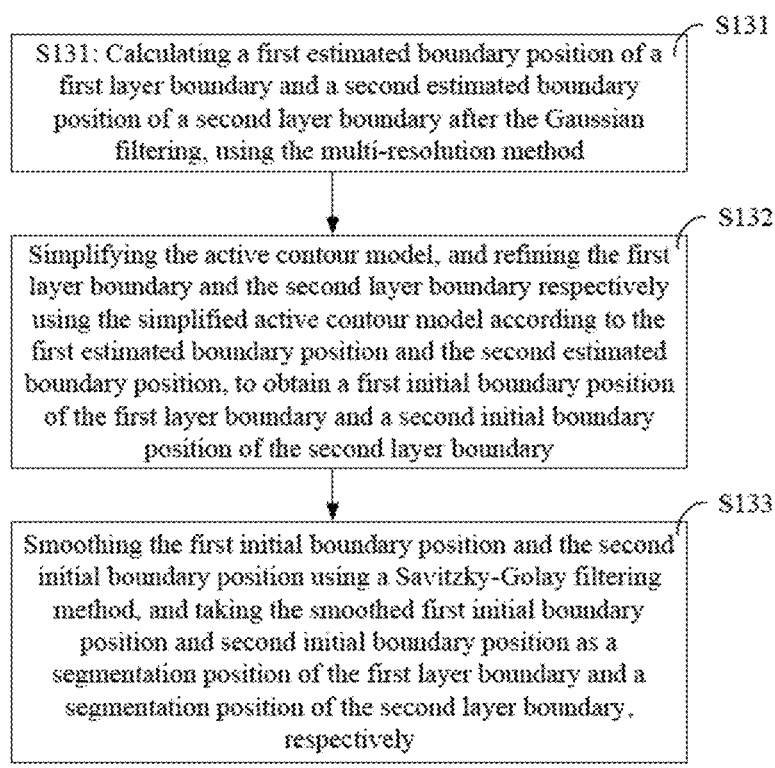
Fig.7

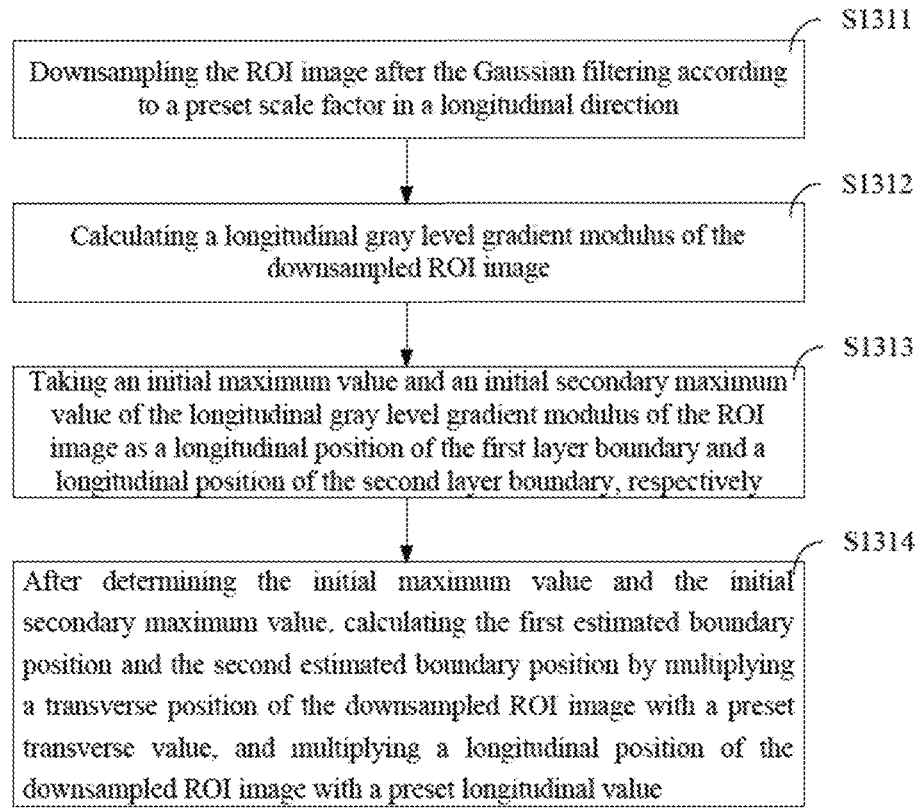
Fig.8
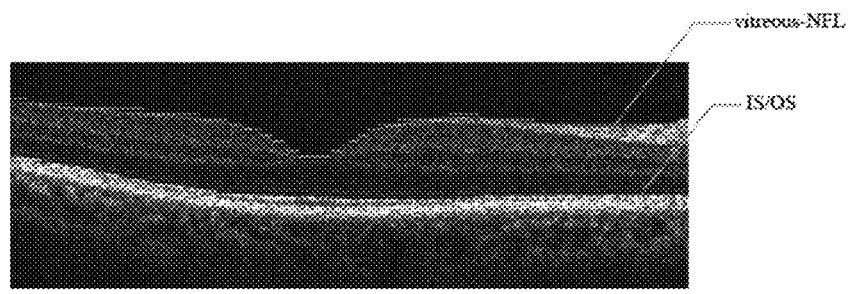
Fig.9
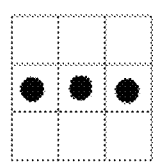 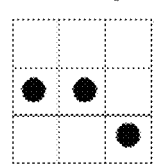 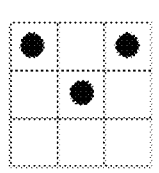 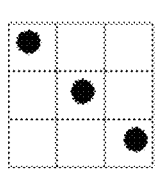
Fig.10    Fig.11    Fig.12    Fig.13

METHOD FOR ACQUIRING RETINA STRUCTURE FROM OPTICAL COHERENCE TOMOGRAPHIC IMAGE AND SYSTEM THEREOF

TECHNICAL FIELD

The present disclosure relates to the technical field of optical imaging, and particularly, to a method for acquiring a retina structure from an optical coherence tomographic image and a system thereof.

BACKGROUND

Optical Coherence Tomography (OCT) is an optical signal acquiring and processing method without invasion to the organization structure of an imaging surface. In recent years, OCT has become a main retina disease diagnosis technique.

Regarding the retina disease diagnosis, doctors need to partition, recognize and diagnose the images of normal and diseased regions of the retina in real time. OCT can achieve a higher spatial resolution (several microns) than other imaging means such as ultrasonic imaging, X-ray imaging and magnetic resonance imaging, thus attracts extensive attentions recently.

The quantitative analyses of different layers of the retina can promote the diagnosis of the visual function change and help doctors to diagnose glaucoma, age-related macular degeneration, diabetes I, multiple sclerosis, Alzheimer's disease and Parkinson's disease. Thus, it is important to perform quantitative analyses of thicknesses of different layers of the retina while ensuring the speed and accuracy. Some people segment the retina through graph cut, and the error of analyzing 100 frames of retinas data of 10 normal persons is 0.94±0.82 microns, with an average speed of 9740 milliseconds per image.

But the existing segmentation methods are usually slow, and cannot meet the doctors' requirements of real-time capability and accuracy at the same time.

SUMMARY OF THE INVENTION

The technical problem to be solved by the present disclosure is to introduce a new way to improve the image segmentation speed for normal and abnormal human eyes while meeting the accuracy requirement.

The present disclosure provides a method for acquiring a retina structure from an optical coherence tomographic image, comprising: calculating a Region of Interest (ROI) image of a single retina optical coherence tomographic source image; performing a Gaussian filtering on the ROI image; calculating a first estimated boundary position of a first layer boundary and a second estimated boundary position of a second layer boundary after the Gaussian filtering, using a multi-resolution method; simplifying an active contour model, and initially refining the first layer boundary and the second layer boundary respectively using the simplified active contour model according to the first estimated boundary position and the second estimated boundary position, to obtain a first initial boundary position of the first layer boundary and a second initial boundary position of the second layer boundary; smoothing the first initial boundary position and the second initial boundary position using a Savitzky-Golay filtering method, and taking the smoothed first initial boundary position and the smoothed second initial boundary position as a segmentation position of the first layer boundary and a segmentation position of the second layer boundary, respectively; acquiring segmentation positions of rest layer boundaries in the ROI image according to the segmented position of the first layer boundary and the segmented position of the second layer boundary, to obtain segmentation positions of all the layer boundaries in the ROI image.

The present disclosure further provides a method for acquiring a retina structure from an optical coherence tomographic image, comprising: calculating a Region of Interest (ROI) image of a retina optical coherence tomographic source image of a first frame of three-dimensional image volume data; performing a Gaussian filtering on the ROI image of the first frame; acquiring a segmentation position of a first layer boundary and a segmentation position of a second layer boundary in the ROI image of the first frame, according to a multi-resolution method and a simplified active contour model; acquiring segmentation positions of rest layer boundaries in the ROI image of the first frame according to the segmented position of the first layer boundary and the segmented position of the second layer boundary, to obtain segmentation positions of all the layer boundaries in the ROI image of the first frame; determining segmentation positions of layer boundaries in a second frame image according to the segmented positions of all the layer boundaries in the ROI image of the first frame, determining segmentation positions of layer boundaries in a third frame image according to the segmented positions of the layer boundaries in the second frame image, and orderly making iterations to obtain segmentation positions of layer boundaries in all the rest frame images, wherein the first, second and third frames are orderly adjacent frames.

The present disclosure utilizes the layered structure characteristics of the retina image and converts the two-dimensional image segmentation into the one-dimensional positioning, thereby simplifying the calculation process. The present disclosure proposes a customized active contour model for an initial positioning to reduce the calculation complexity, and in conjunction with the subsequent edge curve smoothing based on the Savitzky-Golay algorithm, it is beneficial to obtain a smooth boundary. The present disclosure models adjacent frames using the correlation between adjacent OCT images through the Kalman filtering, which avoids the repetitive initialization beginning from the second frame. At the same time, the filtering algorithm can improve robustness to the image distortion caused by the occurrence of blood vessel shade in the image, the motion, or the non-uniform illumination. The method in the embodiment of the present disclosure can ensure that each layer boundary of the retina image is quickly obtained while ensuring the segmentation accuracy.

BRIEF DESCRIPTION OF THE DRAWINGS

In order to more clearly describe the technical solutions in the embodiments of the present disclosure or the prior art, the drawings to be used in the descriptions of the embodiments or the prior art will be briefly introduced as follows. Obviously, the drawings in the following descriptions just illustrate some embodiments of the present disclosure, and a person skilled in the art can obtain other drawings from them without paying any creative effort. In which.

FIGS. 5 and 6 illustrate images before and after a one-dimensional Gaussian filtering of a first frame image in an embodiment of the present disclosure;

FIG. 7 is a flow diagram of a method for acquiring previous two layer boundaries in an embodiment of the present disclosure;

FIG. 8 is flow diagram of a method for estimating a layer boundary using a multi-resolution method in an embodiment of the present disclosure;

FIG. 9 illustrates an image after a layer boundary is estimated using a multi-resolution method in an embodiment of the present disclosure;

FIGS. 10 to 13 are schematic diagrams of horizontal, inflectional, V-shaped and diagonal arrangements of three adjacent points, respectively, in an embodiment of the present disclosure;

DETAILED DESCRIPTION OF THE EMBODIMENTS

In order that the objectives, technical solutions and advantages of the embodiments of the present disclosure are clearer, the embodiments of the present disclosure will be further described in details as follows with reference to the drawings. Here the exemplary embodiments of the present disclosure and descriptions thereof are just used to explain, rather than limiting, the present disclosure.

The present disclosure provides a method for acquiring a retina structure from an optical coherence tomographic image. The method utilizes correlation between adjacent OCT images, models adjacent frames through Kalman filtering, orderly calculates the position of the retina layer boundary in each frame, and finally obtains the retina structure. In which, the retina layer boundary includes Inner Segment-Outer Segment (IS-OS), Vitreous Body-Retinal Nerve Fiber Layer (Vitreous-NFL), Outer Segment-Retinal Pigment Epithelium (OS-RPE), Retinal Pigment Epithelium-Choroid (RPE-Choroid), Outer Plexiform Layer-Outer Nuclear Layer (OPL-ONL), Inner Nuclear Layer-Outer Plexiform Layer (INL-OPL), Inner Plexiform Layer-Inner Nuclear Layer (IPL-INL), and Nerve Fiber Layer-Ganglion Cell Layer (NFL-GCL).

The present disclosure processes the first frame and other frames of the three-dimensional volume data respectively, and a single frame image is processed in the same way as the first frame of the three-dimensional volume data. The method for processing the first frame or the single frame image of the three-dimensional volume data can specifically include preprocessing, initial segmentation through active contour model, and boundary refinement; the method for processing the non-first frame image of the three-dimensional volume data can include preprocessing, Kalman filtering initialization, initial segmentation through active contour model, and boundary refinement.

Figure 1:
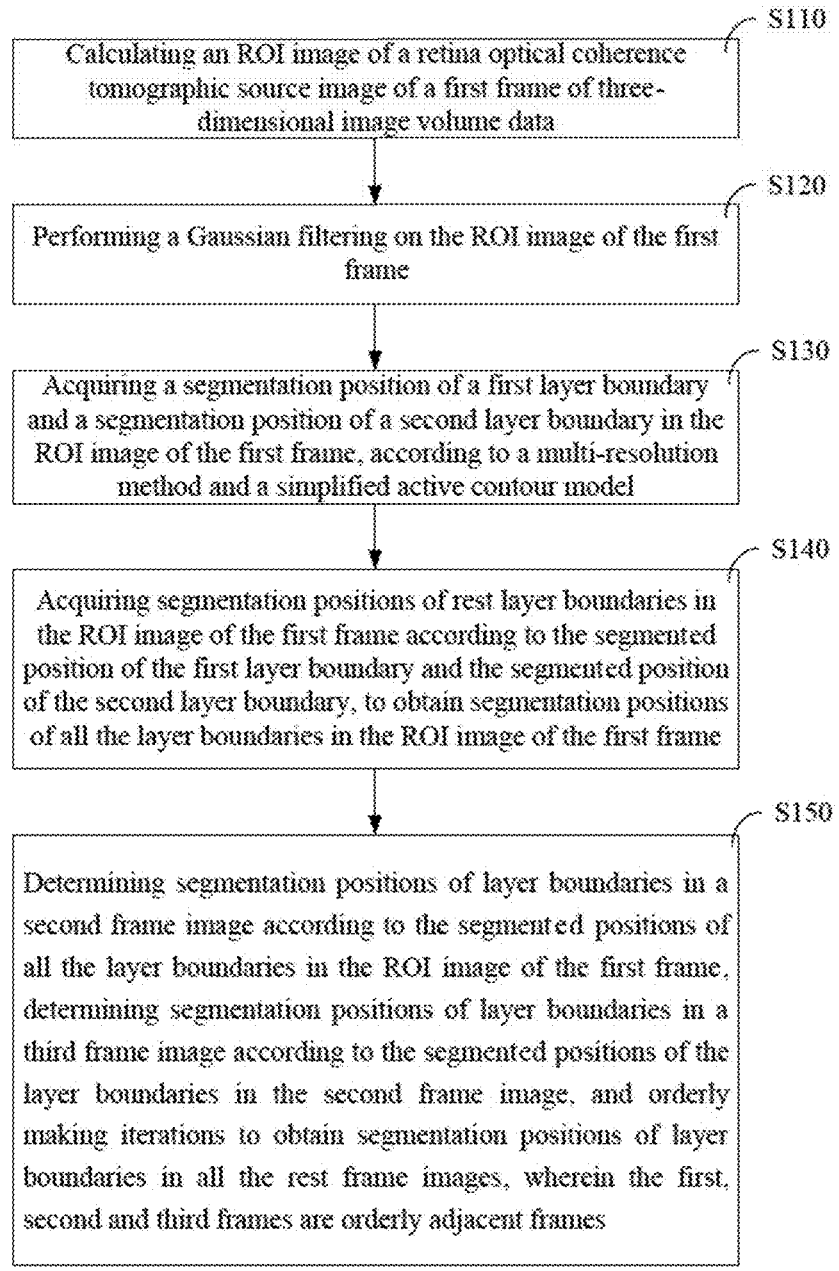
FIG. 1 is a flow diagram of a method for acquiring a retina structure from an optical coherence tomographic image in an embodiment of the present disclosure.

FIG. 1 is a flow diagram of a method for acquiring a retina structure from an optical coherence tomographic image in an embodiment of the present disclosure. As illustrated in FIG. 1, the method for acquiring a retina structure from an optical coherence tomographic image comprises the steps of:

S110: calculating a Region of Interest (ROI) image of a retina optical coherence tomographic source image of a first frame of three-dimensional image volume data;

S120: performing a Gaussian filtering on the ROI image of the first frame;

S130: acquiring a segmentation position of a first layer boundary and a segmentation position of a second layer boundary in the ROI image of the first frame, according to a multi-resolution method and a simplified active contour model;

S140: acquiring segmentation positions of rest layer boundaries in the ROI image of the first frame according to the segmented position of the first layer boundary and the segmented position of the second layer boundary, to obtain segmentation positions of all the layer boundaries in the ROI image of the first frame;

S150: determining segmentation positions of layer boundaries in a second frame image according to the segmented positions of all the layer boundaries in the ROI image of the first frame, determining segmentation positions of layer boundaries in a third frame image according to the segmented positions of the layer boundaries in the second frame image, and orderly making iterations to obtain segmentation positions of layer boundaries in all the rest frame images, wherein the first, second and third frames are orderly adjacent frames.

The method for acquiring a retina structure from an optical coherence tomographic image in the embodiment of the present disclosure firstly determines the position of the retina layer boundary in the first frame image, and then utilizes the correlation between adjacent OCT images to orderly obtain the positions of the retina layer boundaries in other frame images, thereby avoiding repetitively initializing other frames from the second frame, and obviously improving the speed of acquiring the three-dimensional retina structure. In addition, the method uses the filtering algorithm, which can improve robustness to the image distortion caused by the occurrence of blood vessel shade in the image, the motion, or the non-uniform illumination.

In step S110, the "first frame" means a first image initially processed, which may be the first frame or other frame of the three-dimensional image initially scanned, which is not limited herein. The ROI image contains the retina axial image, including the whole retina or a part thereof.

In step S130, the positions of the first layer boundary and the second layer boundary can be estimated using the multi-resolution method, and initial boundaries of the first layer boundary and the second layer boundary can be obtained using the simplified active contour model. To be noted, preferably, the first layer boundary and the second layer boundary are the two layer boundaries most obvious or most clear in the source image.

In step S150, during the three-dimensional image scanning, the first frame is adjacent to the second frame, and the second frame is adjacent to the third frame. As can be seen from the priori knowledge, the retina layer boundaries of the images of adjacent frames are correlated.

In which, the "iteration" means determining the segmentation position of the layer boundary in the second frame image according to the segmented position of the layer boundary in the first frame image, determining the segmentation position of the layer boundary in the third frame image according to the segmented position of the layer boundary in the second frame image, . . . , determining the segmentation position of the layer boundary in the $(t+1)^{th}$ frame image according to the segmented position of the layer boundary in the $t^{th}$ frame image, . . . , and determining the segmentation position of the layer boundary in the last, i.e., the $T^{th}$ frame image according to the segmented position of the layer boundary in the $(T-1)^{th}$ frame image, wherein T and t are positive integers. In brief, the segmentation position of the layer boundary in the present frame image is determined according to the segmented position of the layer boundary in the previous frame image.

Figure 2:
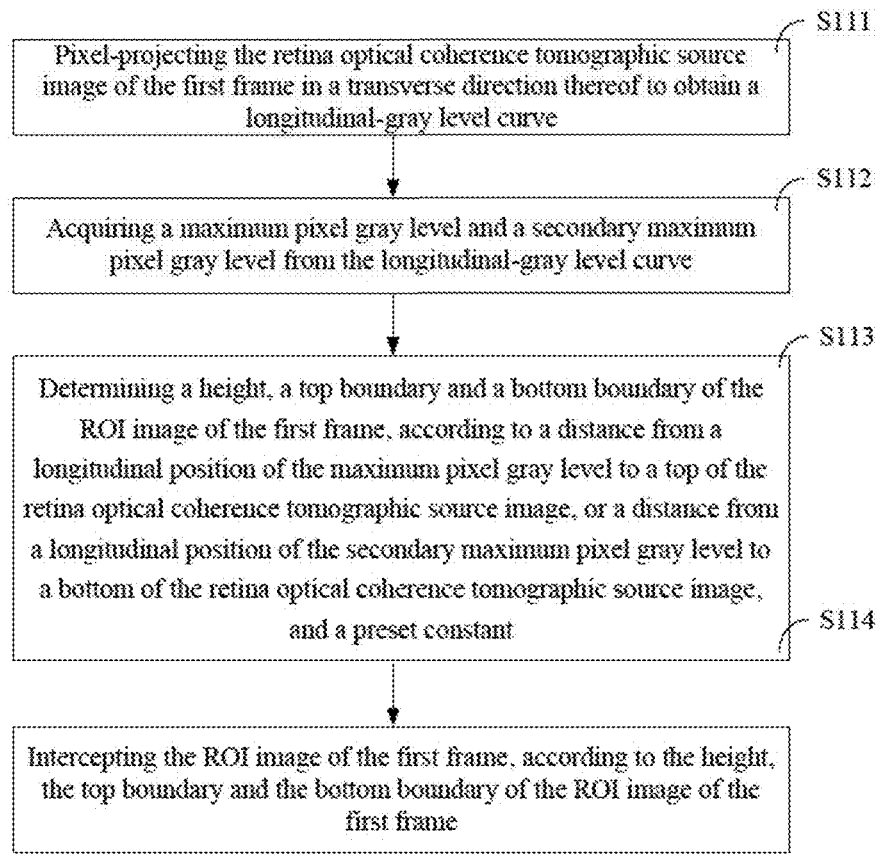
FIG. 2 is a flow diagram of a method for acquiring a Region of Interest (ROI) image in an embodiment of the present disclosure.

FIG. 2 is a flow diagram of a method for acquiring an ROI image in an embodiment of the present disclosure. As illustrated in FIG. 2, in step S110, the method for calculating an ROI image of a retina optical coherence tomographic source image of a first frame of three-dimensional image volume data may comprise the steps of:

S111: pixel-projecting the retina optical coherence tomographic source image of the first frame in a transverse direction thereof to obtain a longitudinal-gray level curve;

S112: acquiring a maximum pixel gray level and a secondary maximum pixel gray level from the longitudinal-gray level curve;

S113: determining a height, a top boundary and a bottom boundary of the ROI image of the first frame, according to a distance from a longitudinal position of the maximum pixel gray level to a top of the retina optical coherence tomographic source image, or a distance from a longitudinal position of the secondary maximum pixel gray level to a bottom of the retina optical coherence tomographic source image, and a preset constant;

S114: intercepting the ROI image of the first frame, according to the height, the top boundary and the bottom boundary of the ROI image of the first frame.

In the embodiment of the present disclosure, the ROI image is intercepted before the subsequent processing on the OCT image, which can reduce the obvious redundancy existed in the axial direction, and any subsequent processing can be performed for the ROI image, thereby decreasing the calculation cost while locating more accurately.

In step S111, pixel-projecting the retina optical coherence tomographic source image of the first frame in a transverse direction thereof to obtain a longitudinal-gray level curve specifically can be achieved through the following projection formula:

$$g(y_j) = \frac{1}{M} \sum_{i=0}^{M-1} f(x_i, y_j), \quad (1)$$

In formula (1), $f(x_i, y_j)$ is a gray level of a pixel $(x_i, y_j)$, i and j are horizontal (transverse) and vertical (axial) positions of the image, respectively, and M is a width of the image.

Figure 3:
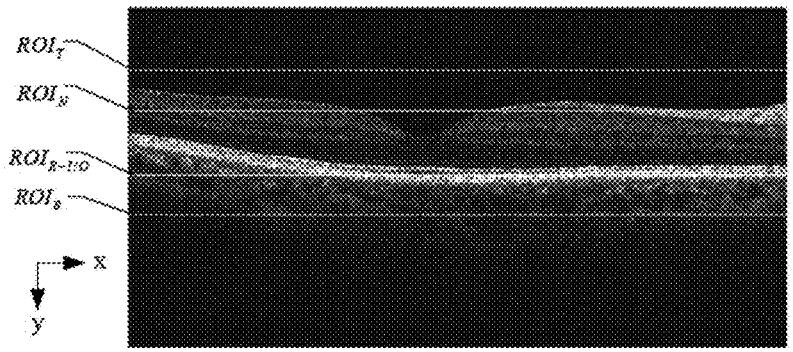
FIG. 3 illustrates a retina optical coherence tomographic source image of a first frame in an embodiment of the present disclosure.
Figure 4:
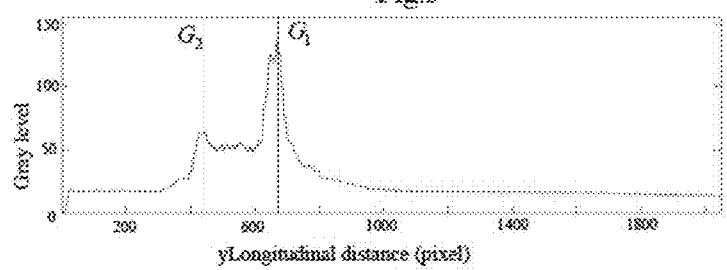
FIG. 4 illustrates a longitudinal-gray level curve in an embodiment of the present disclosure.

FIG. 3 illustrates a retina optical coherence tomographic source image of a first frame in an embodiment of the present disclosure, wherein transverse direction x is from left to right in a horizontal direction, and longitudinal direction y is from top to bottom in a vertical direction. FIG. 4 illustrates a longitudinal-gray level curve in an embodiment of the present disclosure. As illustrated in FIG. 4, the longitudinal-gray level curve is obtained through a projection in the transverse direction according to formula (1), wherein a horizontal ordinate is a pixel distance (i.e., retinal depth) corresponding to longitudinal direction y in FIG. 3, and a vertical coordinate is a gray level or gray scale in longitudinal direction y. As can be seen from FIGS. 3 and 4, after the projection, in longitudinal direction y, the maximum pixel gray level G1 and the secondary pixel gray level G2 will correspond to a center line $ROI_{R-I/O}$ of a retinal pigment epithelium-inner segment/outer segment (RPE-IS/OS) composite layer and a center line $ROI_N$ of a retinal nerve fiber layer (NFL), respectively.

Next, according to the priori knowledge, a distance from the center line $ROI_{R-I/O}$ of the RPE-IS/OS (or a distance from the center line $ROI_N$ of the NFL) to the top (or bottom) of the ROI image is fixed and related to the height of the image. That is, the distance may be set as $h=\rho H_{ROI}$, wherein $\rho$ is a preset constant, for example $\rho=0.1$, $H_{ROI}$ is a height of the intercepted ROI image, and the distance h can be obtained by measurement.

As illustrated in FIG. 3, an upper boundary $ROI_T$, a lower boundary $ROI_B$ and a height $H_{ROI}$ of the ROI image can be obtained through the above method, and the final ROI image is obtained after removing the image of the redundant portion.

In step S120, the method for performing a Gaussian filtering on the ROI image of the first frame for example may be a one-dimensional Gaussian filtering in longitudinal direction y of the first frame image.

FIGS. 5 and 6 illustrate images before and after a one-dimensional Gaussian filtering of a first frame image in an embodiment of the present disclosure. After performing a one-dimensional Gaussian filtering of an image as illustrated in FIG. 5 with a standard deviation of 5 and an average value of 0, an image as illustrated in FIG. 6 is obtained, and the image becomes more uniform in intensity. In other embodiment, the standard deviation may be any value within [4, 6], and a similar filtering result can be achieved.

In the embodiment of the present disclosure, since the edges of the OCT retina image are almost horizontal, a one-dimensional Gaussian filtering of the image is performed in the longitudinal direction, so that the edges are reserved while the noise is suppressed.

FIG. 7 is a flow diagram of a method for acquiring previous two layer boundaries in an embodiment of the present disclosure. As illustrated in FIG. 7, in step S130, the method for acquiring a segmentation position of a first layer boundary and a segmentation position of a second layer boundary in the ROI image of the first frame, according to a multi-resolution method and a simplified active contour model may comprise the steps of:

S131: calculating a first estimated boundary position of a first layer boundary and a second estimated boundary position of a second layer boundary after the Gaussian filtering, using the multi-resolution method;

S132: simplifying the active contour model, and refining the first layer boundary and the second layer boundary respectively using the simplified active contour model according to the first estimated boundary position and the second estimated boundary position, to obtain a first initial boundary position of the first layer boundary and a second initial boundary position of the second layer boundary;

S133: smoothing the first initial boundary position and the second initial boundary position using a Savitzky-Golay filtering method, and taking the smoothed first initial boundary position and second initial boundary position as a segmentation position of the first layer boundary and a segmentation position of the second layer boundary, respectively.

In the embodiment of the present disclosure, firstly the first layer boundary and the second layer boundary (e.g., the most obvious two layer boundaries Vitreous-NFL and IS/OS in the OCT image) are extracted, and the accuracy of layer boundary segmentation increases when the first layer boundary and the second layer boundary are more obvious. The positions of the first layer boundary and the second layer boundary are estimated using the multi-resolution method, which is beneficial to reduce the calculation complexity and the noise influence. It is helpful to improve the calculation speed by determining the initial boundary position of the layer boundary using the simplified active contour model. It is helpful to enhance the uniform and continuous smoothness of the layer boundary by performing a Savitzky-Golay filtering on the image.

FIG. 8 is a flow diagram of a method for estimating a layer boundary using a multi-resolution method in an embodiment of the present disclosure. As illustrated in FIG. 8, in step S131, the method for calculating a first estimated boundary position of a first layer boundary and a second estimated boundary position of a second layer boundary after the Gaussian filtering, using the multi-resolution method may comprise the steps of:

S1311: downsampling the ROI image after the Gaussian filtering according to a preset scale factor in a longitudinal direction;

S1312: calculating a longitudinal gray level gradient modulus of the downsampled ROI image;

S1313: taking an initial maximum value and an initial secondary maximum value of the longitudinal gray level gradient modulus of the ROI image as a longitudinal position of the first layer boundary and a longitudinal position of the second layer boundary, respectively;

S1314: after determining the initial maximum value and the initial secondary maximum value, calculating the first estimated boundary position and the second estimated boundary position by multiplying a transverse position of the downsampled ROI image with a preset transverse value, and multiplying a longitudinal position of the downsampled ROI image with a preset longitudinal value.

In the embodiment of the present disclosure, the positions of the most obvious two layer boundaries can be estimated at first by calculating the initial maximum value and the initial secondary maximum value of the longitudinal gray level gradient modulus, thereby greatly reducing the calculation complexity and the noise influence.

In one specific embodiment, in step S1311, the source image is represented as $f_{H_0 w_0}(x,y)$, and the source image $f_{H_0 w_0}(x,y)$ can be downsampled with a scale factor of 2 in the vertical direction according to the following formula:

$$f_{H_1 w_0}(x, y) = \frac{1}{2}[f_{H_0 w_0}(x, 2y) + f_{H_0 w_0}(x, 2y+1)], \quad (2)$$

The image is downsampled in the vertical (longitudinal) direction and the horizontal (transverse) direction according to the following formulas:

$$f_{H_2 w_0}(x, y) = \frac{1}{2}[f_{H_1 w_0}(x, 2y) + f_{H_1 w_0}(x, 2y+1)], \quad (3)$$

$$f_{H_3 w_0}(x, y) = \frac{1}{2}[f_{H_2 w_0}(x, 2y) + f_{H_2 w_0}(x, 2y+1)], \quad (4)$$

$$f_{H_4 w_0}(x, y) = \frac{1}{2}[f_{H_3 w_0}(x, 2y) + f_{H_3 w_0}(x, 2y+1)], \quad (5)$$

$$f_{H_4 w_1}(x, y) = \frac{1}{2}[f_{H_4 w_0}(2x, y) + f_{H_4 w_0}(2x+1, y)], \quad (6)$$

$$f_{42}(x, y) = f_{H_4 w_2}(x, y) = \frac{1}{2}[f_{H_4 w_1}(2x, y) + f_{H_4 w_1}(2x+1, y)], \quad (7)$$

wherein, the subscripts H and W of f represent a longitudinal direction and a transverse direction of a pixel point (x, y) in the image; the subscript digit of the longitudinal direction H represents a serial number of the pixel point downsampled with a scale factor of 2 in the longitudinal direction; for example, when the subscript of H is 4, the longitudinal pixel point position of the downsampled pixel point in the image is $2^4=16$; the subscript digit of the transverse direction W represents a serial number of the pixel point downsampled with a scale factor of 2 in the transverse direction; for example, when the subscript of W is 1, the transverse pixel point position of the downsampled pixel point in the image is $2^1=2$.

In step S1312, the gradient modulus g(x,y) of the image is calculated in a coarse scale according to the following formulas:

$$g_x(x,y) = 2f_{42}(x,y) + f_{42}(x,y-1) + f_{42}(x,y+1) - 2f_{42}(x-1,y) - f_{42}(x-1,y-1)f_{42}(x-1,y+1), \quad (8)$$

$$g_y(x,y) = 2f_{42}(x,y) + f_{42}(x-1,y) + f_{42}(x+1,y) - 2f_{42}(x,y-1) - f_{42}(x-1,y-1) - f_{42}(x+1,y-1), \quad (9)$$

$$g(x,y) = [g_x^2(x,y) + g_y^2(x,y)]^{1/2}, \quad (10)$$

wherein, g(x,y) is a gray level gradient modulus, x is a transverse coordinate, and y is a longitudinal coordinate.

In step S1314, the transverse position of the downsampled ROI image is multiplied with a preset transverse value such as 4, the longitudinal position thereof is multiplied with a preset longitudinal value such as 16, and the position multiplied with the preset transverse value and the preset longitudinal value is taken as a boundary position of the source image, as illustrated in FIG. 9, so as to estimate two obvious layer boundaries Vitreous-NFL and IS/OS.

In step S132, the typical active contour model is simplified to obtain the simplified active contour model, wherein the typical active contour model is $$E=\int[\alpha(s)E_{continuity}+\beta(s)E_{curvature}+\gamma(s)E_{image}]ds, \quad (11)$$

wherein $\alpha(s)$, $\beta(s)$ and $\gamma(s)$ are weight coefficients; $E_{continuity}$ is a continuous energy item that functions to achieve more uniform distances between the boundary points in the snake model, and the discrete form of $E_{continuity}$ may be written as $v_i - v_{i-1}$ ($v_i$ represents a coordinate vector of the ith point); $E_{curvature}$ is a bending energy item that functions to make the snake model be smoother, and $E_{curvature}$ may be represented as $|v_{i-1} - 2v_i + v_{i+1}|$; $E_{image}$ is an image energy item that functions to make the snake model converge to the edge in the image, and it may be represented as $(g_{cur} - g_{min})/(g_{max} - g_{min})$, wherein $g_{cur}$, $g_{max}$ and $g_{min}$ represent a gray level gradient moduluses of the current point, and a maximum value and a minimum value of a gray level gradient modulus of a point in a neighborhood, respectively.

In the inventor's consideration, the following reasonable restrictions are made to the active contour model of each layer of boundary:

1) there is only one boundary point in each column;
2) in each iteration made with the active contour model, the boundary point in each column can only move one pixel/voxel vertically upwards or downwards;
3) the boundary point in each column shall be adjacent to a previous point and a next point in 8 neighborhoods (eight neighborhood of a pixel (x, y) is a set of pixels with one of the coordinates (x−1, y−1), (x, y−1), (x+1, y−1), (x−1, y), (x+1, y), (x−1, y+1), (x, y+1) and (x+1, y+1));

Through the above restrictions, as illustrated in FIGS. 10 to 13, the three adjacent points of the active contour model in the embodiment of the present disclosure can only be arranged in four patterns: horizontal, inflectional, V-shaped and diagonal.

Thus, the following results can be obtained:

1) for two adjacent boundary points, $E_{continuity}$ can only be 1 or $2^{1/2}$;
2) for horizontal and diagonal patterns, $E_{continuity}$ is 0; for inflectional pattern, $E_{continuity}$ is 1; and for V-shaped pattern, $E_{continuity}$ is 2.

Since the continuity energy and bending energy do not vary largely after the restrictions, the inventor simplifies the typical active contour model formula (11), and only reserves the third item-image energy item, so as to reduce the calculation complexity.

In one embodiment, the third item-image energy item can be defined as follows:

$$E_{image} = \sum_{j=k+1}^{j=k+n} f(x_i, y_j) - \sum_{j=k-1}^{j=k-n} f(x_i, y_j), \quad (12)$$

wherein, $E_{image}$ is an image energy item, $f(x_i, y_j)$ is a gray level of a pixel $(x_i, y_j)$, i and j are positions of the pixel $(x_i, y_j)$ in transverse direction x and longitudinal direction y, respectively, k is a pixel position in a layer boundary (e.g., any one of the first to eighth layer boundaries), and n is a longitudinal neighborhood radius of the pixel position k.

Figure 14:
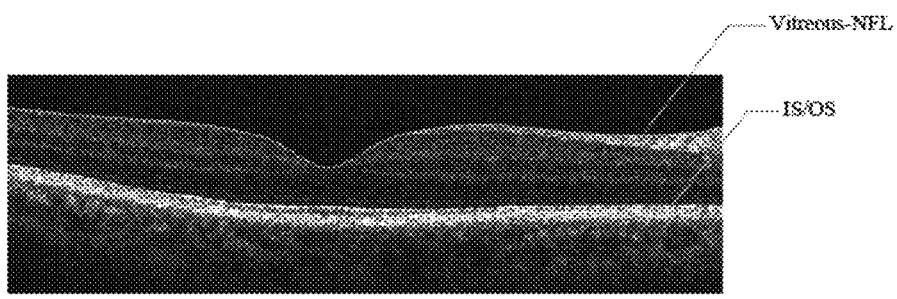
FIG. 14 is a schematic diagram of a result of an active contour model processing for the image in FIG. 9 in an embodiment of the present disclosure.

FIG. 14 is a schematic diagram of a result of an active contour model processing for the image in FIG. 9 in an embodiment of the present disclosure. As illustrated in FIG. 14, the initial boundary positions of layer boundaries Vitreous-NFL and IS/OS are obtained after the processing with the simplified active contour model as shown in formula (12).

Figure 15:
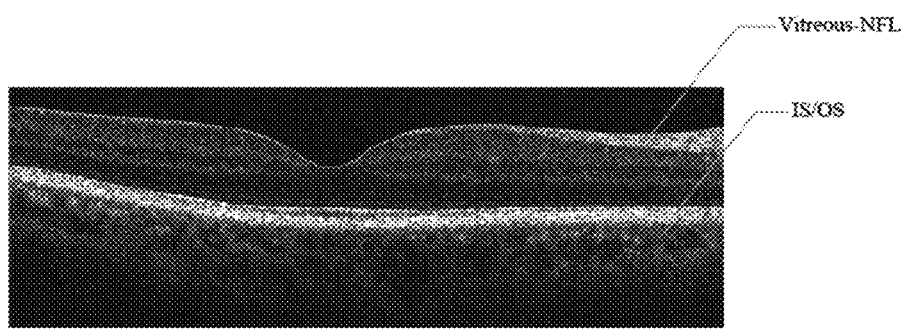
FIG. 15 illustrates an image obtained after the image in FIG. 14 is processed in a Savitzky-Golay curve smoothing method in an embodiment of the present disclosure.

In step S133, the image after the active contour processing may be further processed in a Savitzky-Golay curve smoothing method, with an order of 4, and the neighborhood radius may be any value within [20, 30] pixel range for different layer boundaries. The Savitzky-Golay curve smoothing method can eliminate shape fluctuations that might be caused when the continuity energy and the bending energy is not considered in the simplified active contour model, so that the layer boundary becomes smoother. FIG. 15 illustrates an image obtained after the image in FIG. 14 is processed in a Savitzky-Golay curve smoothing method in an embodiment of the present disclosure. As can be seen from FIGS. 14 and 15, the layer boundaries Vitreous-NFL and IS/OS are smoother after the curve smoothing.

After two layer boundaries (e.g., the most obvious two layer boundaries) in the OCT retina image are obtained, they can serve as constraint items for segmenting other layer boundaries, and other layer boundaries can be segmented more conveniently through those constraints.

Figure 16:
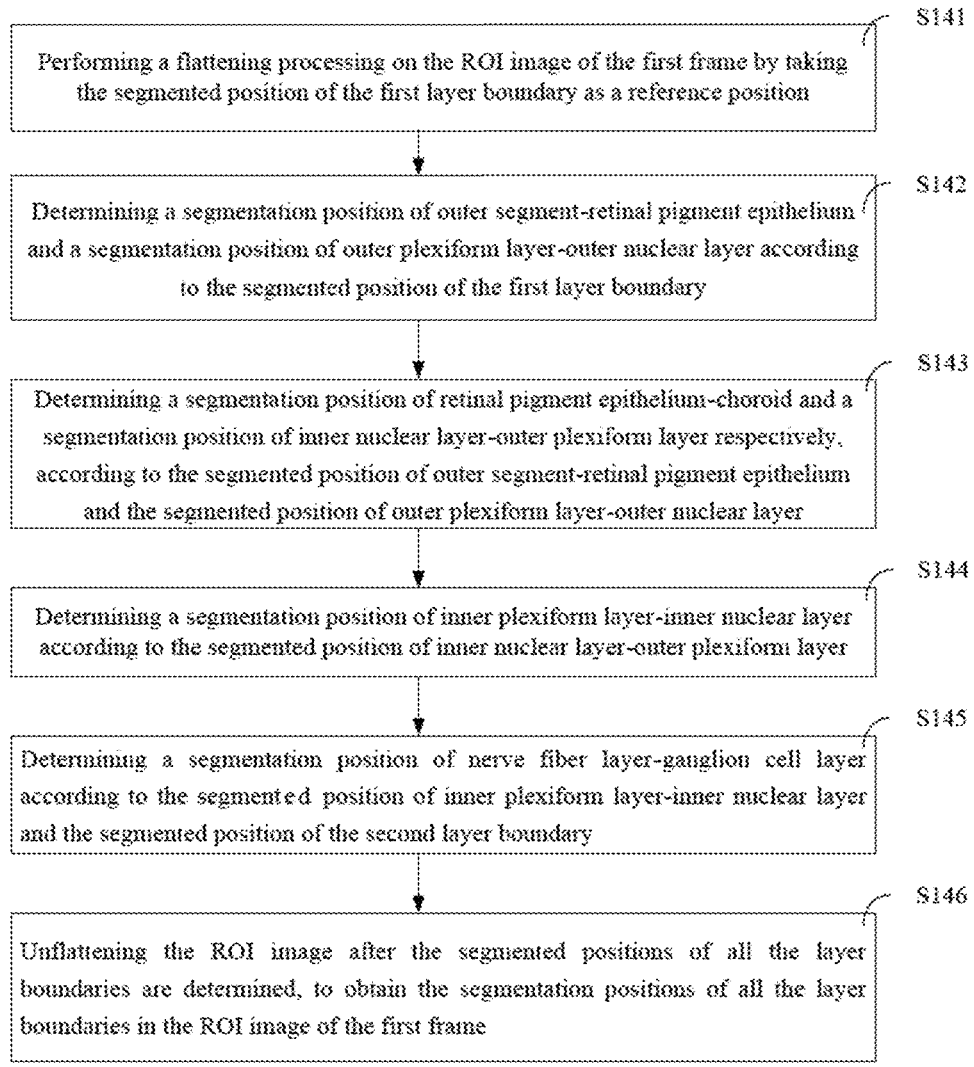
FIG. 16 is a flow diagram of a method for acquiring rest layer boundaries according to previous two layer boundaries in an embodiment of the present disclosure.
Figure 17:
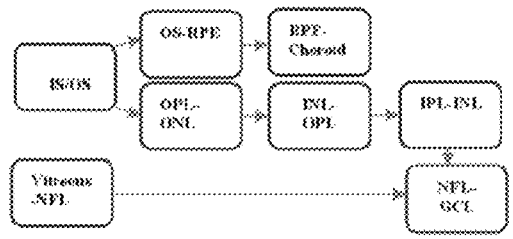
FIG. 17 is a schematic diagram of processing orders of the layer boundaries corresponding to FIG. 16.

FIG. 16 is a flow diagram of a method for acquiring rest layer boundaries according to previous two layer boundaries in an embodiment of the present disclosure. FIG. 17 is a schematic diagram of processing orders of the layer boundaries corresponding to FIG. 16. In conjunction with FIG. 17 and as illustrated in FIG. 16, in step S140, the method for acquiring segmentation positions of rest layer boundaries in the ROI image of the first frame according to the segmented position of the first layer boundary and the segmented position of the second layer boundary, to obtain segmentation positions of all the layer boundaries in the ROI image of the first frame may comprise the steps of:

S141: performing a flattening processing on the ROI image of the first frame by taking the segmented position of the first layer boundary as a reference position;

S142: determining a segmentation position of outer segment-retinal pigment epithelium and a segmentation position of outer plexiform layer-outer nuclear layer according to the segmented position of the first layer boundary;

S143: determining a segmentation position of retinal pigment epithelium-choroid and a segmentation position of inner nuclear layer-outer plexiform layer respectively, according to the segmented position of outer segment-retinal pigment epithelium and the segmented position of outer plexiform layer-outer nuclear layer;

S144: determining a segmentation position of inner plexiform layer-inner nuclear layer according to the segmented position of inner nuclear layer-outer plexiform layer;

S145: determining a segmentation position of nerve fiber layer-ganglion cell layer according to the segmented position of inner plexiform layer-inner nuclear layer and the segmented position of the second layer boundary;

S146: unflattening the ROI image after the segmented positions of all the layer boundaries are determined, to obtain the segmentation positions of all the layer boundaries in the ROI image of the first frame;

wherein, the first to eighth layer boundaries are respectively the boundary of IS-OS, Vitreous-NFL, OS-RPE, OPL-ONL, RPE-Choroid, INL-OPL, IPL-INL, and NFL-GCL, in the first frame image.

In step S141, the embodiment of the present disclosure employs an image flattening operation. Particularly, the first layer boundary (e.g., the IS/OS boundary) may be taken as a reference. The flattening operation is performed as follows.

Firstly, finding a maximum value of coordinate y of the IS/OS layer boundary, which may be represented as $max_y$;

Next, moving pixels in each column (e.g., the $j^{th}$ column) of images downwards for ($max_y$-$y_j$) pixel positions, wherein $y_j$ represents coordinate y of an IS/OS boundary pixel.

Figure 18:
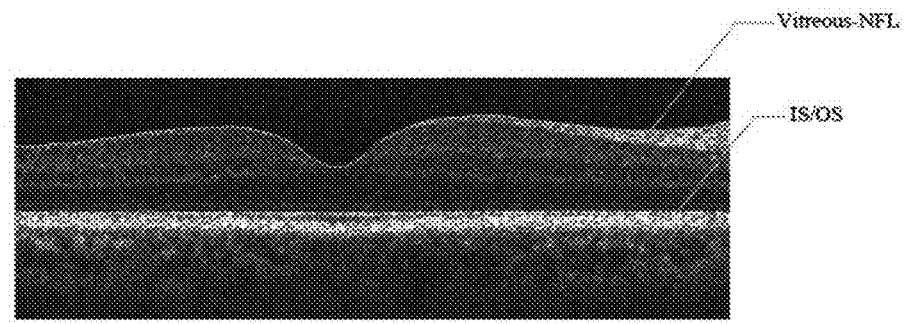
FIG. 18 illustrates the image in FIG. 15 after a flattening processing in an embodiment of the present disclosure.

In one embodiment, after a flattening processing on the image as illustrated in FIG. 15 is performed, as illustrated in FIG. 18, the obtained layer boundary IS/OS is a straight line. Next, other layers are segmented based on the flattened image, which is beneficial to process the retina image with its layer boundary deformed by diseases.

After all the rest layer boundaries are segmented, unflattening inverse operation on the image is performed through step S146, to obtain the retina structure of the real image of the first frame image.

In one embodiment, the unflattening operation on the image may be performed as follows: moving pixels in each column (e.g., the jth column) of images upwards for ($max_y$-$y_j$) pixel positions based on the flattened image.

Segmenting other layer boundaries may also include the three steps described above: initializing, performing an initial segmentation using the simplified active contour/model, and performing a curve smoothing through a Savitzky-Golay filtering.

Figure 19:
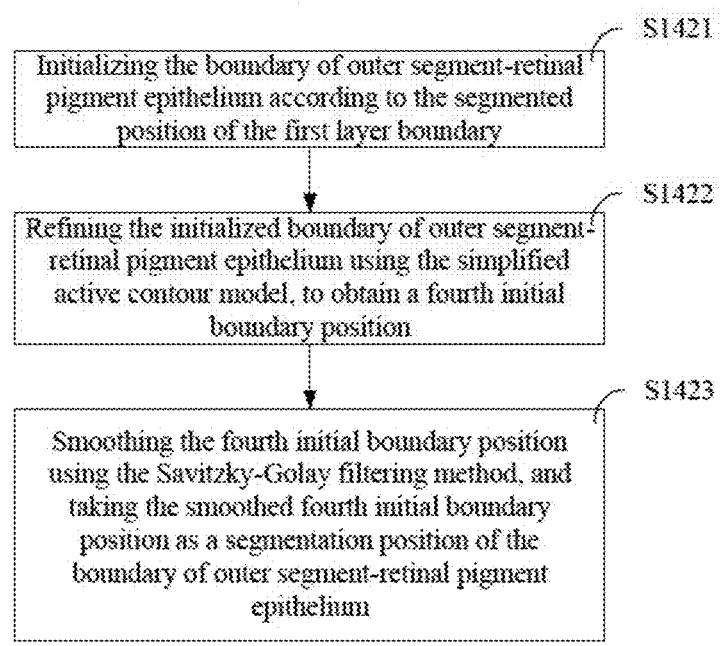
FIG. 19 is a flow diagram of a method for segmenting a boundary of outer segment-retinal pigment epithelium in an embodiment of the present disclosure.

FIG. 19 is a flow diagram of a method for segmenting a boundary of outer segment-retinal pigment epithelium in an embodiment of the present disclosure. As illustrated in FIG. 19, in step S142, the method for determining a segmentation position of outer segment-retinal pigment epithelium and a segmentation position of outer plexiform layer-outer nuclear layer according to the segmented position of the first layer boundary may comprise the steps of:

S1421: initializing the boundary of outer segment-retinal pigment epithelium according to the segmented position of the first layer boundary;

S1422: refining the initialized boundary of outer segment-retinal pigment epithelium using the simplified active contour model, to obtain a fourth initial boundary position;

S1423: smoothing the fourth initial boundary position using the Savitzky-Golay filtering method, and taking the smoothed fourth initial boundary position as a segmentation position of the boundary of outer segment-retinal pigment epithelium.

In the embodiment of the present disclosure, the calculation complexity of the boundary of outer segment-retinal pigment epithelium can be reduced by refining the initialized boundary of outer segment-retinal pigment epithelium using the simplified active contour model. The initial boundary position of outer segment-retinal pigment epithelium is smoothed using the Savitzky-Golay filtering method, which can enhance boundary smoothness.

Figure 20:
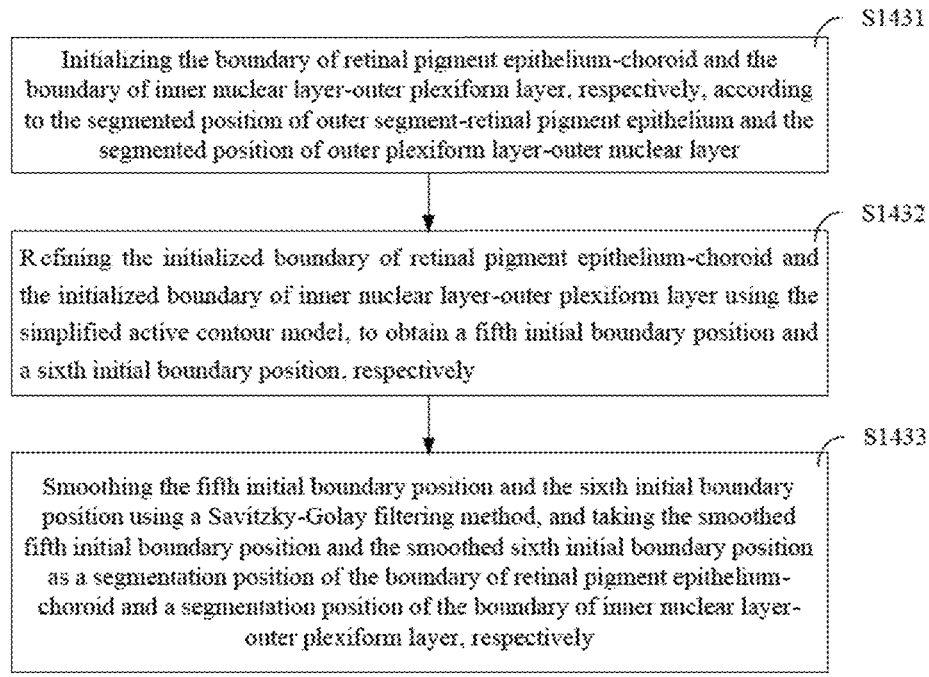
FIG. 20 is a flow diagram of a method for segmenting a boundary of retinal pigment epithelium-choroid and a boundary of inner nuclear layer-outer plexiform layer in an embodiment of the present disclosure.

FIG. 20 is a flow diagram of a method for segmenting a boundary of retinal pigment epithelium-choroid and a boundary of inner nuclear layer-outer plexiform layer in an embodiment of the present disclosure. As illustrated in FIG. 20, in step S143, the method for determining a segmentation position of retinal pigment epithelium-choroid and a segmentation position of inner nuclear layer-outer plexiform layer respectively, according to the segmented position of outer segment-retinal pigment epithelium and the segmented position of outer plexiform layer-outer nuclear layer may comprise the steps of:

S1431: initializing the boundary of retinal pigment epithelium-choroid and the boundary of inner nuclear layer-outer plexiform layer, respectively, according to the segmented position of outer segment-retinal pigment epithelium and the segmented position of outer plexiform layer-outer nuclear layer;

S1432: refining the initialized boundary of retinal pigment epithelium-choroid and the initialized boundary of inner nuclear layer-outer plexiform layer using the simplified active contour model, to obtain a fifth initial boundary position and a sixth initial boundary position, respectively;

S1433: smoothing the fifth initial boundary position and the sixth initial boundary position using a Savitzky-Golay filtering method, and taking the smoothed fifth initial boundary position and the smoothed sixth initial boundary position as a segmentation position of the boundary of retinal pigment epithelium-choroid and a segmentation position of the boundary of inner nuclear layer-outer plexiform layer, respectively.

The above segmentation method may be performed only for one of the boundary of retinal pigment epithelium-choroid and the boundary of the inner nuclear layer-outer plexiform layer, and the other boundary may be partitioned using other method. (This extension may not be valid and should be crossed out)

In the embodiment of the present disclosure, the calculation complexities of the boundary of retinal pigment epithelium-choroid and the boundary of inner nuclear layer-outer plexiform layer can be reduced by refining the initialized boundary of retinal pigment epithelium-choroid and the initialized boundary of inner nuclear layer-outer plexiform layer using the simplified active contour model. The initial boundary positions of retinal pigment epithelium-choroid and inner nuclear layer-outer plexiform layer are smoothed using the Savitzky-Golay filtering method, which can enhance boundary smoothness.

Figure 21:
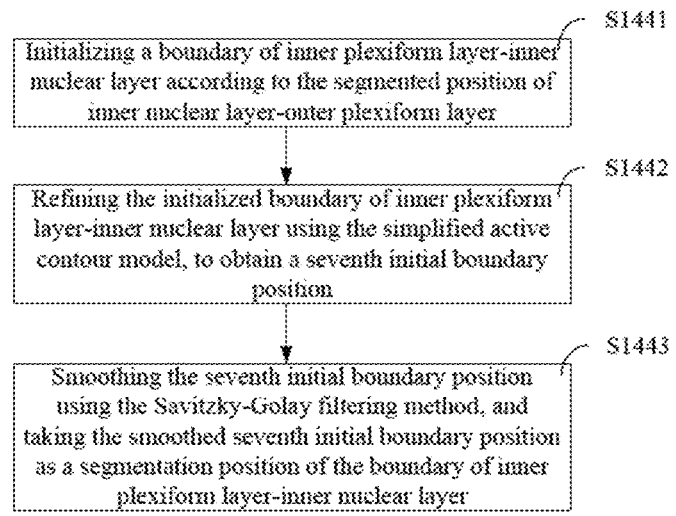
FIG. 21 is a flow diagram of a method for segmenting a boundary of inner plexiform layer-inner nuclear layer in an embodiment of the present disclosure.

FIG. 21 is a flow diagram of a method for segmenting a boundary of inner plexiform layer-inner nuclear layer in an embodiment of the present disclosure. As illustrated in FIG. 21, in step S144, the method for determining a segmentation position of inner plexiform layer-inner nuclear layer according to the segmented position of inner nuclear layer-outer plexiform layer may comprise the steps of:

S1441: initializing a boundary of inner plexiform layer-inner nuclear layer according to the segmented position of inner nuclear layer-outer plexiform layer;

S1442: refining the initialized boundary of inner plexiform layer-inner nuclear layer using the simplified active contour model, to obtain a seventh initial boundary position;

S1443: smoothing the seventh initial boundary position using the Savitzky-Golay filtering method, and taking the smoothed seventh initial boundary position as a segmentation position of the boundary of inner plexiform layer-inner nuclear layer.

In the embodiment of the present disclosure, the calculation complexity of the boundary of inner plexiform layer-inner nuclear layer can be reduced by refining the initialized boundary of inner plexiform layer-inner nuclear layer using the simplified active contour model. The initial boundary position of inner plexiform layer-inner nuclear layer is smoothed using the Savitzky-Golay filtering method, which can enhance boundary smoothness.

Figure 22:
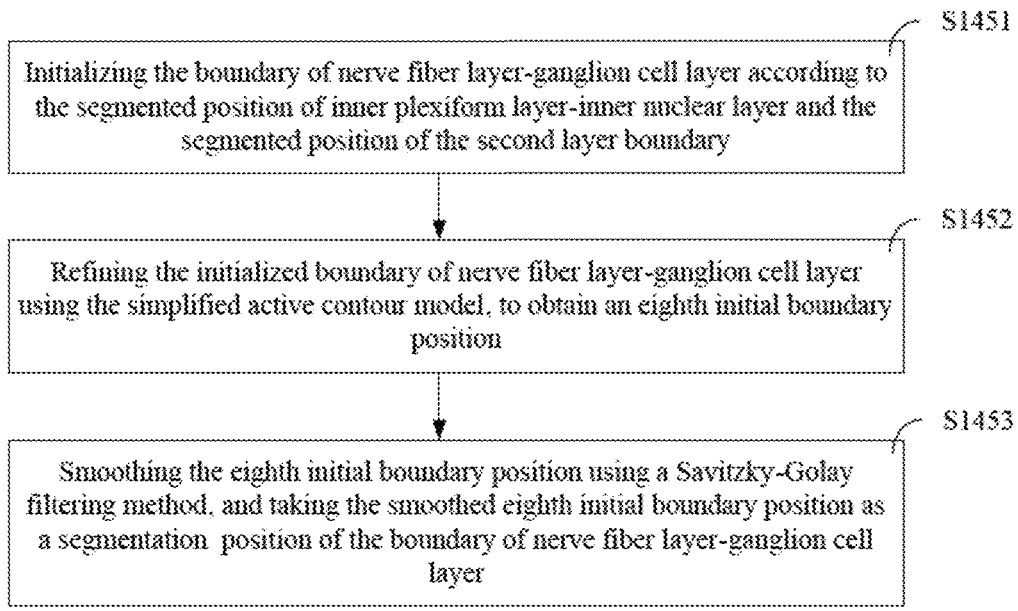
FIG. 22 is a flow diagram of a method for segmenting a boundary of nerve fiber layer-ganglion cell layer in an embodiment of the present disclosure.

FIG. 22 is a flow diagram of a method for segmenting a boundary of nerve fiber layer-ganglion cell layer in an embodiment of the present disclosure. As illustrated in FIG. 22, in step S145, the method for determining a segmentation position of nerve fiber layer-ganglion cell layer according to the segmented position of inner plexiform layer-inner nuclear layer and the segmented position of the second layer boundary may comprise the steps of:

S1451: initializing the boundary of nerve fiber layer-ganglion cell layer according to the segmented position of inner plexiform layer-inner nuclear layer and the segmented position of the second layer boundary;

S1452: refining the initialized boundary of nerve fiber layer-ganglion cell layer using the simplified active contour model, to obtain an eighth initial boundary position;

S1453: smoothing the eighth initial boundary position using a Savitzky-Golay filtering method, and taking the smoothed eighth initial boundary position as a segmentation position of the boundary of nerve fiber layer-ganglion cell layer.

In step S1451, the boundary of nerve fiber layer-ganglion cell layer is initialized according to the segmented position of inner plexiform layer-inner nuclear layer and the segmented position of the second layer boundary. In other embodiment, the boundary of nerve fiber layer-ganglion cell layer can be initialized just according to one of the segmented position of inner plexiform layer-inner nuclear layer and the segmented position of the second layer boundary, i.e., the segmentation position of nerve fiber layer-ganglion cell layer can be determined according to one of the segmented position of inner plexiform layer-inner nuclear layer and the segmented position of the second layer boundary.

In the embodiment of the present disclosure, the calculation complexity of the boundary of nerve fiber layer-ganglion cell layer can be reduced by refining the initialized boundary of nerve fiber layer-ganglion cell layer using the simplified active contour model. The initial boundary position of nerve fiber layer-ganglion cell layer is smoothed using the Savitzky-Golay filtering method, which can enhance boundary smoothness.

The above two methods are used for initialization and initial segmentation. The present disclosure initializes a single image or the first frame in the three-dimensional volume data using the priori knowledge. In one embodiment, the initial position of OS/RPE is 70 μm below IS/OS, the initial position of RPE-Choroid is 105 μm below OS-RPE, OPL-ONL is 105 μm above IS/OS, INL-OPL is 105 μm above OPL-ONL, IPL-INL is 105 μm above INL-OPL, and the initial position of NFL-GCL is an average value of those of Vitreous-NFL and IPL-INL in the vertical direction.

Figure 23:
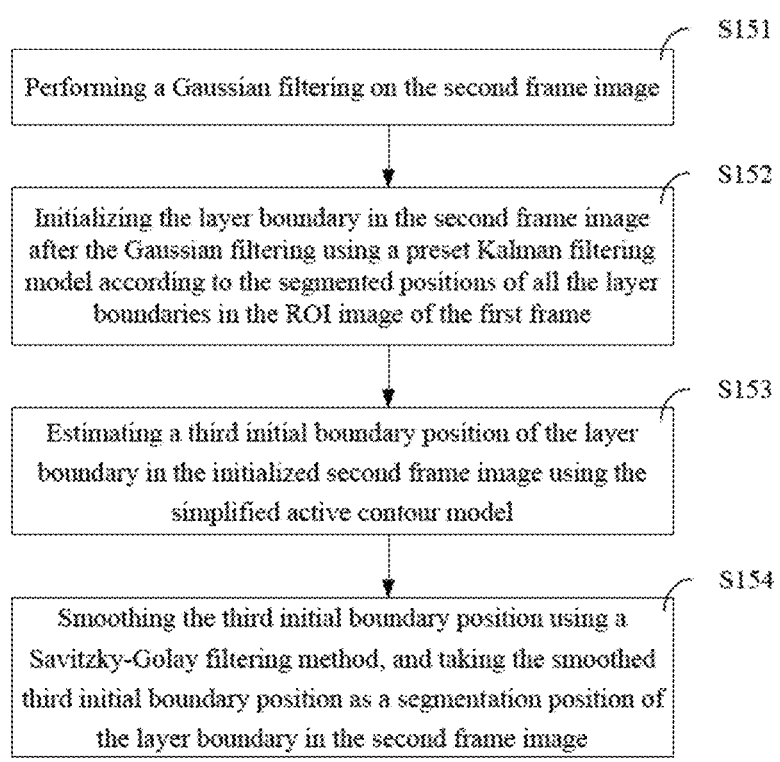
FIG. 23 is a flow diagram of a method for segmentation a layer boundary in a non-first frame image in an embodiment of the present disclosure.

FIG. 23 is a flow diagram of a method for segmenting a layer boundary in a non-first frame image in an embodiment of the present disclosure. As illustrated in FIG. 23, in step S150, the method for determining segmentation positions of layer boundaries in a second frame image according to the segmented positions of all the layer boundaries in the ROI image of the first frame, determining segmentation positions of layer boundaries in a third frame image according to the segmented positions of the layer boundaries in the second frame image, and orderly making iterations to obtain segmentation positions of layer boundaries in all the rest frame images may comprise the steps of:

S151: performing a Gaussian filtering on the second frame image;

S152: initializing the layer boundary in the second frame image after the Gaussian filtering using a preset Kalman filtering model according to the segmented positions of all the layer boundaries in the ROI image of the first frame;

S153: estimating a third initial boundary position of the layer boundary in the initialized second frame image using the simplified active contour model;

S154: smoothing the third initial boundary position using a Savitzky-Golay filtering method, and taking the smoothed third initial boundary position as a segmentation position of the layer boundary in the second frame image.

In steps S151 to S153, the specific methods for processing the non-first frame image by a Gaussian filtering, a Kalman filtering and an active contour may be in the same forms as those in the above embodiments, and achieve the same effects, which are omitted herein.

In one embodiment, in step S154, according to the priori knowledge, corresponding layer boundaries in adjacent image frames are adjacent and similar to each other for the three-dimensional image volume data. The initial position of the boundary in the current frame can be estimated from corresponding boundary in the previous frame. The embodiment of the present disclosure initializes the layer boundary of each frame using preset Kalman filtering, which is beneficial to estimate the layer boundary in the non-first frame image.

The inventor considers that errors may occur when the mass point motion rate of the layer boundary point of the current frame is calculated from the mass point motion rate of the layer boundary point of the previous frame directly using a mass point motion equation which is a uniform rate motion equation, so a random quantity is added to correct the mass point motion rate of the layer boundary point of the current frame, and the following formula is obtained:

$$v_{k+1}v_k + \text{rand}(v_{k+1}), \qquad (13)$$

wherein, $v_{k+1}$ and $v_k$ are mass point motion rates of layer boundaries in the $(k+1)^{th}$ and $k^{th}$ frame images, respectively; $v_{k+1}/v_k$ is a change rate of coordinate y of a mass point on the layer boundary in the $(k+1)^{th}$ frame image; k is the serial number of a frame, and k is an integer larger than or equal to 1; when k=1, the serial number of the frame is the first frame; when k=2, the serial number of the frame is the second frame; when k=3, the serial number of the frame is the third frame, and the like. It may be set that the motion rate $v_1=1.0$. rand($v_{k+1}$) is a random variable of the motion rate $v_{k+1}$, and the random variable rand($v_{k+1}$) may be a random number having an average value of 0 and a standard deviation of 1.0. After the change rate $v_k/v_{k-1}$ of coordinate y of the mass point on each layer boundary of the current frame is obtained, coordinate y of the mass point on the current layer boundary can be known:

$$y_{k+1} = y_k + v_{k+1} \times dt + K_{k+1}(z_{k+1} - y_k), \qquad (14)$$

wherein, $y_{k+1}$ and $y_k$ are the same longitudinal position coordinates on the same layer boundaries in the $(k+1)^{th}$ and $k^{th}$ frame images, respectively; the motion rate $v_{k-1}$ can be calculated from formula (13); dt is a time interval between the kth and $(k+1)^{th}$ frames, and it may be about 1.0; $K_{k+1}$ is a point gain on the layer boundary in the $(k+1)^{th}$ frame, and it can be calculated from formula (15); and $z_{k+1}$ is a measured value of a point on the layer boundary in the $(k+1)^{th}$ frame.

$z_1$ is a measured value of the first frame, which can be calculated from the customized and simplified active contour model. Regarding the measured value of the non-first frame (k≥2), firstly, coordinate y of a boundary point of a previous frame may be marked as m, and then a maximum value of the gray level gradient is sought in a range for example 10 pixels upward and downward by taking m as the center, so that coordinate y of a position corresponding to the maximum value is $z_k$.

The above gain formula may be calculated as:

$$K_{k+1} = \frac{\sigma_k}{\sigma_k + R_k}, \quad (15)$$

wherein, $R_k$ is a difference between a measured value of a layer boundary point in the kth frame (which can be obtained from the simplified active contour model) and a data smoothed value (which can be obtained from the Savitzky-Golay algorithm, and it may be assumed that the data smoothed value is a real value), and it may be set that $R_1=1.0$; $\sigma_{k+1}$ and $\sigma_k$ are noise variances of the model in the $(k+1)^{th}$ and the $k^{th}$ frames; it may be set that $\sigma_1=1.0$, and other noise variance $\sigma_{k+1}$ can be obtained from the following formula:

$$\sigma_{k+1}=(1-K_k)\sigma_k, \quad (16)$$

$K_k$ is a gain of the layer boundary in the kth frame, and $K_1$ may be about 0.5.

Figure 24:
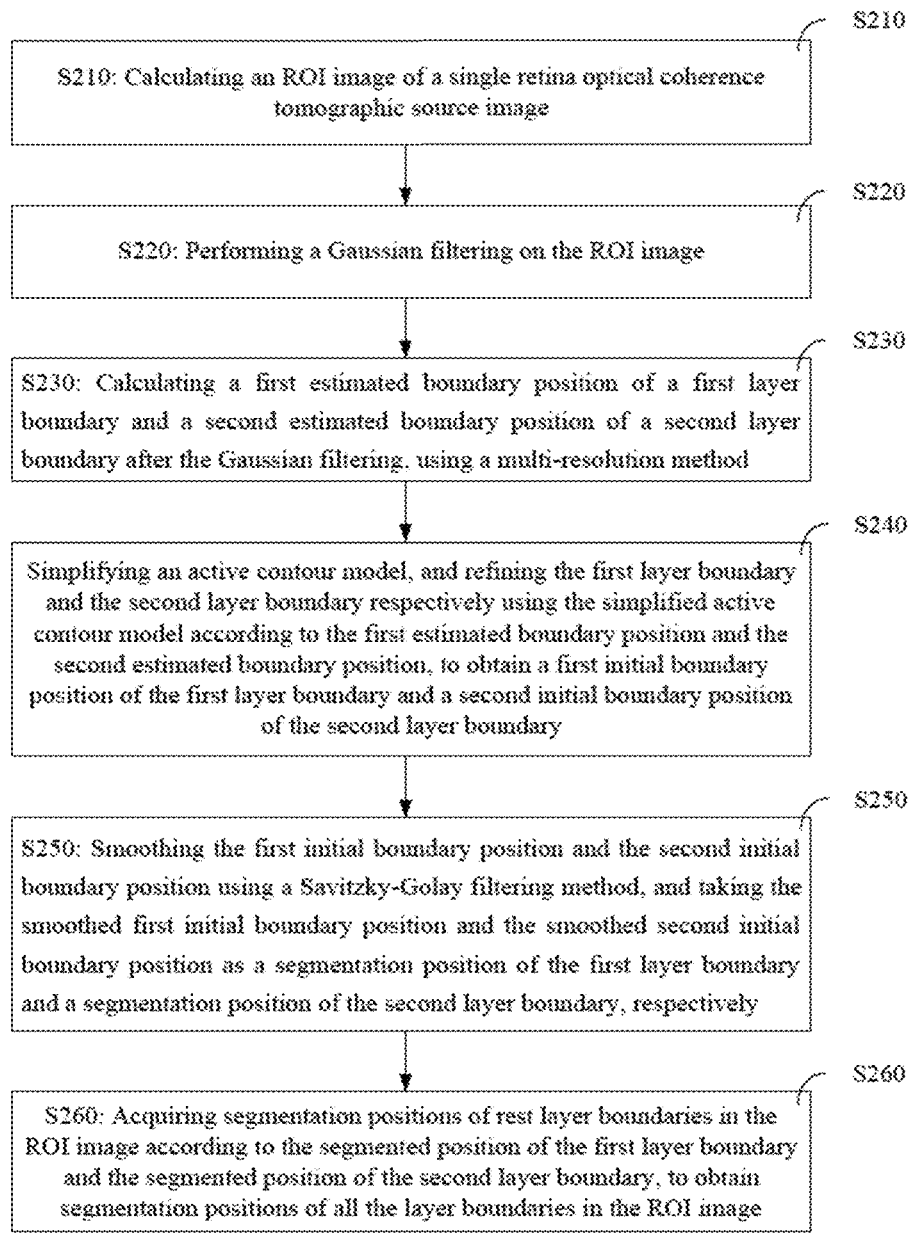
FIG. 24 is a flow diagram of a method for acquiring a retina structure from an optical coherence tomographic image in another embodiment of the present disclosure.

In the embodiment of the present disclosure, the layer boundary point may also be referred to as an edge point, and the layer boundary may also be referred to as a layer edge; wherein the frame when k=1 is the first frame from which the calculation starts, and the retina structure can be obtained in the above method for acquiring the layer boundary in the first frame image or a single image, such as the method of steps S110 to S140 in FIG. 1 or the method in FIG. 24; when k≥2, the retina structure is obtained using the condition of non-first frame, such as the method in FIG. 1 (especially step S150).

The most serious limitation to the existed automatic retina segmentation methods is that the speed is not fast, which affects the doctor's subsequent real-time diagnosis. Recently, based on the partial differential equations, there are rapid progresses in control theory and machine learning theory, thereby laying a good foundation for improving the segmentation accuracy of the retina diseased image.

The present disclosure models for adjacent frames using the correlation between adjacent OCT images through the Kalman filtering, which avoids the repetitive initialization beginning from the second frame. At the same time, the filtering algorithm can improve robustness to the image distortion due to the occurrence of blood vessel shades in the image, the motion, or the non-uniform illumination. The present disclosure utilizes the layered structure characteristics of the retina image and converts the two-dimensional image segmentation into the one-dimensional positioning, thereby simplifying the calculation process. The present disclosure proposes a customized active contour model for initial positioning to reduce the calculation complexity, and in conjunction with the subsequent curve smoothing based on the Savitzky-Golay algorithm, it is beneficial to obtain a smooth boundary. The method in the embodiment of the present disclosure can ensure that each layer boundary of the retina image is quickly obtained while ensuring the segmentation accuracy.

The present disclosure further provides a method for acquiring a retina structure just from a single image, which is implemented in a similar way to the above method for processing the first frame image. Next, an implementation of the method for acquiring a retina structure from a single image will be described, and the same contents are not repeated.

FIG. 24 is a flow diagram of a method for acquiring a retina structure from an optical coherence tomographic image in another embodiment of the present disclosure. As illustrated in FIG. 24, the method for acquiring a retina structure from an optical coherence tomographic image may comprise the steps of:

S210: calculating an ROI image of a single retina optical coherence tomographic source image;

S220: performing a Gaussian filtering on the ROI image;

S230: calculating a first estimated boundary position of a first layer boundary and a second estimated boundary position of a second layer boundary after the Gaussian filtering, using a multi-resolution method;

S240: simplifying an active contour model, and refining the first layer boundary and the second layer boundary respectively using the simplified active contour model according to the first estimated boundary position and the second estimated boundary position, to obtain a first initial boundary position of the first layer boundary and a second initial boundary position of the second layer boundary;

S250: smoothing the first initial boundary position and the second initial boundary position using a Savitzky-Golay filtering method, and taking the smoothed first initial boundary position and the smoothed second initial boundary position as a segmentation position of the first layer boundary and a segmentation position of the second layer boundary, respectively;

S260: acquiring segmentation positions of rest layer boundaries in the ROI image according to the segmented position of the first layer boundary and the segmented position of the second layer boundary, to obtain segmentation positions of all the layer boundaries in the ROI image.

In the embodiment of the present disclosure, seeking the ROI image is helpful to reduce the axial/longitudinal calculation redundancy; the Gaussian filtering, such as a one-dimensional Gaussian filtering, can enable the image to be uniform; the multi-resolution method is beneficial to reduce the calculation complexity and the noise influence; it is helpful to improve the calculation speed by determining the initial boundary position of the layer boundary using the simplified active contour model; and it is helpful to enhance curve smoothness of the layer boundary by performing a Savitzky-Golay filtering on the image.

Figure 25:
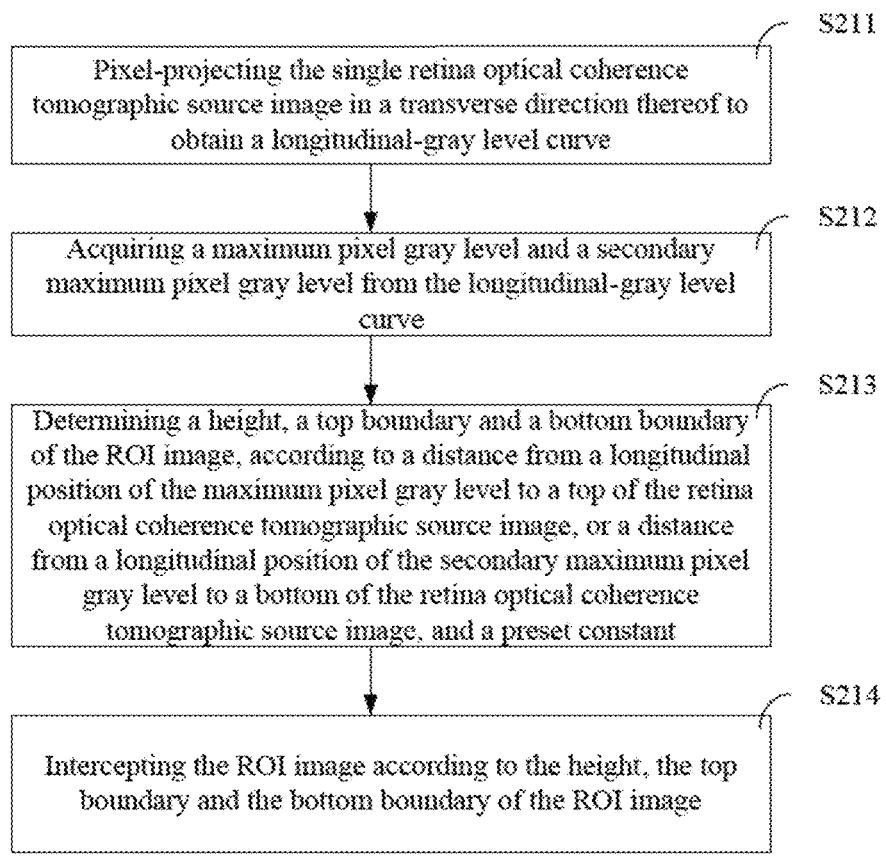
FIG. 25 is a flow diagram of a method for calculating an ROI image of a single source image in an embodiment of the present disclosure.

FIG. 25 is a flow diagram of a method for calculating an ROI image of a single source image in an embodiment of the present disclosure. As illustrated in FIG. 25, in step S210, the method for calculating an ROI image of a single retina optical coherence tomographic source image may comprise the steps of:

S211: pixel-projecting the single retina optical coherence tomographic source image in a transverse direction thereof to obtain a longitudinal-gray level curve;

S212: acquiring a maximum pixel gray level and a secondary maximum pixel gray level from the longitudinal-gray level curve;

S213: determining a height, a top boundary and a bottom boundary of the ROI image, according to a distance from a longitudinal position of the maximum pixel gray level to a top of the retina optical coherence tomographic source image, or a distance from a longitudinal position of the secondary maximum pixel gray level to a bottom of the retina optical coherence tomographic source image, and a preset constant;

S214: intercepting the ROI image according to the height, the top boundary and the bottom boundary of the ROI image.

In the embodiment of the present disclosure, seeking the ROI image is helpful to reduce the axial/longitudinal calculation redundancy; and the projection method is helpful to find the most obvious two layer boundaries to be segmented firstly.

In one embodiment, the layer boundary in a single image is estimated in the same method of estimating the layer boundary using multi-resolution method as illustrated in FIG. 8. The multi-resolution method is helpful to decrease the calculation complexity of the single image and reduce the noise influence.

In one embodiment, the rest layer boundaries are obtained from the first two layer boundaries in a single image using the same method as illustrated in FIGS. 16 and 17. It is helpful to process the single retina image with its layer boundary deformed due to diseases, by segmenting other layers from the flattened image.

In one embodiment, the boundary of outer segment-retinal pigment epithelium in a single image is segmented using the same method as illustrated in FIG. 19. The calculation complexity of the boundary of outer segment-retinal pigment epithelium can be reduced by refining the initialized boundary of outer segment-retinal pigment epithelium using the simplified active contour model. The initial boundary position of outer segment-retinal pigment epithelium is smoothed using the Savitzky-Golay filtering method, which can enhance boundary smoothness.

In one embodiment, the boundary of retinal pigment epithelium-choroid and the boundary of inner nuclear layer-outer plexiform layer in the single image are segmented using the same method as illustrated in FIG. 20. Only one of the boundary of retinal pigment epithelium-choroid and the boundary of inner nuclear layer-outer plexiform layer may be partitioned using the above method, and the other boundary may be partitioned using other method (this kind of extension may not be valid and thus should be removed). In the embodiment of the present disclosure, the calculation complexities of the boundary of retinal pigment epithelium-choroid and the boundary of inner nuclear layer-outer plexiform layer can be reduced by refining the initialized boundary of retinal pigment epithelium-choroid and the initialized boundary of inner nuclear layer-outer plexiform layer using the simplified active contour model. The initial boundary positions of retinal pigment epithelium-choroid and inner nuclear layer-outer plexiform layer are smoothed using the Savitzky-Golay filtering method, which can enhance boundary smoothness.

In one embodiment, the boundary of inner plexiform layer-inner nuclear layer in a single image is segmented using the same method as illustrated in FIG. 21. In the embodiment of the present disclosure, the calculation complexity of the boundary of inner plexiform layer-inner nuclear layer can be reduced by refining the initialized boundary of inner plexiform layer-inner nuclear layer using the simplified active contour model. The initial boundary position of inner plexiform layer-inner nuclear layer is smoothed using the Savitzky-Golay filtering method, which can enhance boundary smoothness.

In one embodiment, the boundary of nerve fiber layer-ganglion cell layer in a single image is segmented using the same method as illustrated in FIG. 22. In the embodiment of the present disclosure, the calculation complexity of the boundary of nerve fiber layer-ganglion cell layer can be reduced by refining the initialized boundary of nerve fiber layer-ganglion cell layer using the simplified active contour model. The initial boundary position of nerve fiber layer-ganglion cell layer is smoothed using the Savitzky-Golay filtering method, which can enhance boundary smoothness.

In the above embodiments, the simplified active contour model may only contain an image energy item which may be:

$$E_{image} = \sum_{j=k+1}^{j=k+n} f(x_i, y_j) - \sum_{j=k-1}^{j=k-n} f(x_i, y_j),$$

wherein, $E_{image}$ is an image energy item, $f(x_i, y_j)$ is a gray level of a pixel $(x_i, y_j)$, i and j are positions of the pixel $(x_i, y_j)$ in transverse direction x and longitudinal direction y, respectively, k is a pixel position in a layer boundary (e.g., any one of the first to eighth layer boundaries), and n is a longitudinal neighborhood radius of the pixel position k.

The method of the present disclosure improves the average speed to 60 milliseconds per image by introducing the techniques of the Kalman filtering, the active contour model improved for the retina layered structure, and the curve filtering. The present disclosure adopts a new policy to improve the image segmentation speed for normal and abnormal human eyes while meeting the accuracy requirement.

Figure 26:
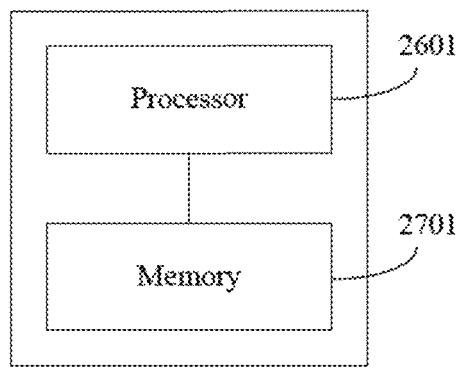
FIG. 26 is a structure diagram of a device in an embodiment of the present disclosure.

As illustrated in FIG. 26, the embodiment of the present disclosure provides a device, comprising:

a processor 2601; and a memory 2602 containing computer readable instructions which, when being executed, cause the processor to perform the operations of:

calculating an ROI image of a single retina optical coherence tomographic source image;

performing a Gaussian filtering on the ROI image;

calculating a first estimated boundary position of a first layer boundary and a second estimated boundary position of a second layer boundary after the Gaussian filtering, using a multi-resolution method;

simplifying an active contour model, and refining the first layer boundary and the second layer boundary respectively using the simplified active contour model according to the first estimated boundary position and the second estimated boundary position, to obtain a first initial boundary position of the first layer boundary and a second initial boundary position of the second layer boundary;

smoothing the first initial boundary position and the second initial boundary position using a Savitzky-Golay filtering method, and taking the smoothed first initial boundary position and the smoothed second initial boundary position as a segmentation position of the first layer boundary and a segmentation position of the second layer boundary, respectively;

acquiring segmentation positions of rest layer boundaries in the ROI image according to the segmented position of the first layer boundary and the segmented position of the second layer boundary, to obtain segmentation positions of all the layer boundaries in the ROI image.

The embodiment of the present disclosure provides a computer readable storage medium containing computer readable instructions which, when being executed, cause the processor to at least perform the operations of:

calculating an ROI image of a single retina optical coherence tomographic source image;

performing a Gaussian filtering on the ROI image;

calculating a first estimated boundary position of a first layer boundary and a second estimated boundary position of a second layer boundary after the Gaussian filtering, using a multi-resolution method;

simplifying an active contour model, and refining the first layer boundary and the second layer boundary respectively using the simplified active contour model according to the first estimated boundary position and the second estimated boundary position, to obtain a first initial boundary position of the first layer boundary and a second initial boundary position of the second layer boundary;

smoothing the first initial boundary position and the second initial boundary position using a Savitzky-Golay filtering method, and taking the smoothed first initial boundary position and the smoothed second initial boundary position as a segmentation position of the first layer boundary and a segmentation position of the second layer boundary, respectively;

acquiring segmentation positions of rest layer boundaries in the ROI image according to the segmented position of the first layer boundary and the segmented position of the second layer boundary, to obtain segmentation positions of all the layer boundaries in the ROI image.

Figure 27:
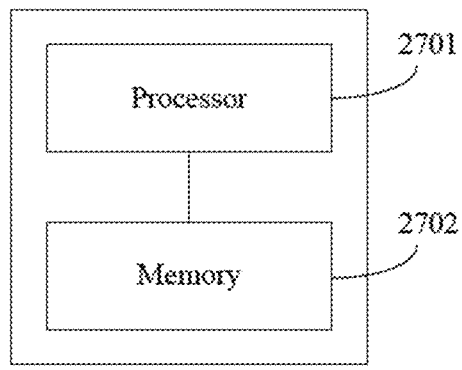
FIG. 27 is a structure diagram of a device in an embodiment of the present disclosure.

As illustrated in FIG. 27, the embodiment of the present disclosure provides a device, comprising:

processor 2701; and a memory 2702 containing computer readable instructions which, when being executed, cause the processor to perform the operations of:

calculating an ROI image of a retina optical coherence tomographic source image of a first frame of three-dimensional image volume data;

performing a Gaussian filtering on the ROI image of the first frame;

acquiring a segmentation position of a first layer boundary and a segmentation position of a second layer boundary in the ROI image of the first frame, according to a multi-resolution method and a simplified active contour model;

acquiring segmentation positions of rest layer boundaries in the ROI image of the first frame according to the segmented position of the first layer boundary and the segmented position of the second layer boundary, to obtain segmentation positions of all the layer boundaries in the ROI image of the first frame;

determining segmentation positions of layer boundaries in a second frame image according to the segmented positions of all the layer boundaries in the ROI image of the first frame, determining segmentation positions of layer boundaries in a third frame image according to the segmented positions of the layer boundaries in the second frame image, and orderly making iterations to obtain segmentation positions of layer boundaries in all the rest frame images, wherein the first, second and third frames are orderly adjacent frames.

The embodiment of the present disclosure provides a computer readable storage medium containing computer readable instructions which, when being executed, cause the processor to at least perform the operations of:

calculating an ROI image of a retina optical coherence tomographic source image of a first frame of three-dimensional image volume data;

performing a Gaussian filtering on the ROI image of the first frame;

acquiring a segmentation position of a first layer boundary and a segmentation position of a second layer boundary in the ROI image of the first frame, according to a multi-resolution method and a simplified active contour model;

acquiring segmentation positions of rest layer boundaries in the ROI image of the first frame according to the segmented position of the first layer boundary and the segmented position of the second layer boundary, to obtain segmentation positions of all the layer boundaries in the ROI image of the first frame;

determining segmentation positions of layer boundaries in a second frame image according to the segmented positions of all the layer boundaries in the ROI image of the first frame, determining segmentation positions of layer boundaries in a third frame image according to the segmented positions of the layer boundaries in the second frame image, and orderly making iterations to obtain segmentation positions of layer boundaries in all the rest frame images, wherein the first, second and third frames are orderly adjacent frames.

The present disclosure specifically has the following advantages:

1) the algorithm in the embodiment of the present disclosure is fast while ensuring the accuracy, and the average speed is 37 times faster than the calculation speed in the prior art;

2) a customized active contour model is proposed, which is suitable for segmenting not only the OCT retina image, but also the image of any layered structure through an extension;

3) a Kalman filtering is proposed to track the boundary of the adjacent image frame, which is suitable for segmenting not only the OCT retina image, but also the sequential images with continual changes in shapes and sizes.

A person skilled in the art shall understand that the embodiments of the present disclosure can be provided as a method, a system or a computer program product. Therefore, the present disclosure can take the form of a full hardware embodiment, a full software embodiment, or an embodiment with combination of software and hardware aspects. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or block diagram of the method, device (system) and computer program product according to the embodiments of the present disclosure. It shall be understood that each flow and/or block in the flow diagram and/or block diagram and a combination of the flow and/or block in the flow diagram and/or block diagram can be realized by the computer program instructions. These computer program instructions can be provided to a general computer, a dedicated computer, an embedded processor or a processor of other programmable data processing device to generate a machine, such that the instructions performed by the computer or the processor of other programmable data processing devices generate the device for implementing the function designated in one flow or a plurality of flows in the flow diagram and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above are only the preferable embodiments of the present disclosure, and are not used for limiting the present disclosure. For a person skilled in the art, the embodiments of the present disclosure can be modified and changed variously. Any modifications, equivalent substitutions and improvements within the spirit and principle of the present disclosure shall be contained in the protection scope of the present disclosure.

The invention claimed is:

1. A method for acquiring a retina structure from an optical coherence tomographic image, comprising:
calculating a region of interest (ROI) image of a single retina optical coherence tomographic source image;
accumulating the single retina optical coherence tomographic source image in a transverse direction thereof to obtain a longitudinal-gray level curve;
acquiring a maximum pixel gray level and a secondary maximum pixel gray level from the longitudinal-gray level curve;
determining a height, a top boundary and a bottom boundary of the ROI image, according to a distance from a longitudinal position of the maximum pixel gray level to a top of the retina optical coherence tomographic source image, or a distance from a longitudinal position of the secondary maximum pixel gray level to a bottom of the retina optical coherence tomographic source image, and a preset constant;
intercepting the ROI image according to the height, the top boundary and the bottom boundary of the ROI image;
performing a Gaussian filtering on the ROI image;
calculating a first estimated boundary position of a first layer boundary and a second estimated boundary position of a second layer boundary after the Gaussian filtering, using a multi-resolution method;
simplifying an active contour model, and refining the first layer boundary and the second layer boundary respectively using the simplified active contour model according to the first estimated boundary position and the second estimated boundary position, to obtain a first initial boundary position of the first layer boundary and a second initial boundary position of the second layer boundary;
smoothing the first initial boundary position and the second initial boundary position using a Savitzky-Golay filtering method, and taking the smoothed first initial boundary position and the smoothed second initial boundary position as a segmentation position of the first layer boundary and a segmentation position of the second layer boundary, respectively;
acquiring segmentation positions of rest layer boundaries in the ROI image according to the segmented position of the first layer boundary and the segmented position of the second layer boundary, to obtain segmentation positions of all the layer boundaries in the ROI image;
wherein pixel-projecting the retina optical coherence tomographic source image of the first frame in a transverse direction thereof to obtain a longitudinal-gray level curve specifically can be achieved through the following projection formula:

$$g(y_j) = \frac{1}{M} \sum_{i=0}^{M-1} f(x_i, y_j),$$

where, $f(x_i, y_j)$ is a gray level of a pixel $(x_i, y_j)$, i and j are horizontal (transverse) and vertical (axial) positions of the image, respectively, and M is a width of the image;
wherein the simplified active contour model only contains an image energy item which is:

$$E_{image} = \sum_{j=k+1}^{j=k+n} f(x_i, y_j) - \sum_{j=k-1}^{j=k-n} f(x_i, y_j),$$

where, $E_{image}$ is an image energy item, $f(x_i, y_j)$ is a gray level of a pixel $(x_i, y_j)$, i and j are positions of the pixel $(x_i, y_j)$ in transverse direction x and longitudinal direction y, respectively, k is a current pixel position in a layer boundary, and n is a longitudinal neighborhood radius of the pixel position k.

2. The method for acquiring a retina structure from an optical coherence tomographic image according to claim 1, wherein calculating the first estimated boundary position of the first layer boundary and the second estimated boundary position of the second layer boundary after the Gaussian filtering, using a multi-resolution method comprises:
downsampling the ROI image after the Gaussian filtering according to a preset scale factor in a longitudinal direction;
calculating a longitudinal gray level gradient modulus of the downsampled ROI image;
taking an initial maximum value and an initial secondary maximum value of the longitudinal gray level gradient modulus of the ROI image as a longitudinal position of the first layer boundary and a longitudinal position of the second layer boundary, respectively;
after determining the initial maximum value and the initial secondary maximum value, calculating the first estimated boundary position and the second estimated boundary position by multiplying a transverse position of the downsampled ROI image with a preset transverse value, and multiplying a longitudinal position of the downsampled ROI image with a preset longitudinal value.

3. The method for acquiring a retina structure from an optical coherence tomographic image according to claim 1, wherein acquiring segmentation positions of rest layer boundaries in the ROI image according to the segmented position of the first layer boundary and the segmented position of the second layer boundary, to obtain segmentation positions of all the layer boundaries in the ROI image comprises:
performing a flattening on the ROI image by taking the segmented position of the first layer boundary as a reference position;
determining a segmentation position of outer segment-retinal pigment epithelium and a segmentation position of outer plexiform layer-outer nuclear layer according to the segmented position of the second layer boundary;
determining a segmentation position of retinal pigment epithelium-choroid and a segmentation position of inner nuclear layer-outer plexiform layer respectively, according to the segmented position of outer segment-retinal pigment epithelium and the segmented position of outer plexiform layer-outer nuclear layer;

determining a segmentation position of inner plexiform layer-inner nuclear layer according to the segmentation position of inner nuclear layer-outer plexiform layer;

determining a segmentation position of nerve fiber layer-ganglion cell layer according to the segmented position of inner plexiform layer-inner nuclear layer and the segmented position of the first layer boundary;

performing unflattening on the ROI image after the segmented positions of all the layer boundaries are determined, to obtain the segmented positions of all the layer boundaries in the ROI image;

wherein, the first to eight layer boundaries are respectively the boundaries of inner segment-outer segment, vitreous-retinal nerve fiber layer inner segment-outer segment, outer segment-retinal pigment epithelium, outer plexiform layer-outer nuclear layer, retinal pigment epithelium-choroid, inner nuclear layer-outer plexiform layer, inner plexiform layer-inner nuclear layer, and nerve fiber layer-ganglion cell layer.

4. The method for acquiring a retina structure from an optical coherence tomographic image according to claim 3, wherein determining a segmentation position of outer segment-retinal pigment epithelium and a segmentation position of outer plexiform layer-outer nuclear layer according to the segmented position of the second layer boundary comprises:

initializing the boundary of outer segment-retinal pigment epithelium according to the segmented position of the second layer boundary;

refining the initialized boundary of outer segment-retinal pigment epithelium using the simplified active contour model, to obtain a fourth initial boundary position;

smoothing the fourth initial boundary position using the Savitzky-Golay filtering method, and taking the smoothed fourth initial boundary position as a segmentation position of the boundary of outer segment-retinal pigment epithelium.

5. The method for acquiring a retina structure from an optical coherence tomographic image according to claim 3, wherein determining a segmentation position of retinal pigment epithelium-choroid and a segmentation position of inner nuclear layer-outer plexiform layer respectively, according to the segmented position of outer segment-retinal pigment epithelium and the segmented position of outer plexiform layer-outer nuclear layer comprises:

initializing the boundary of retinal pigment epithelium-choroid and the boundary of inner nuclear layer-outer plexiform layer, respectively, according to the segmented position of outer segment-retinal pigment epithelium and the segmented position of outer plexiform layer-outer nuclear layer;

refining the initialized boundary of retinal pigment epithelium-choroid and the initialized boundary of inner nuclear layer-outer plexiform layer using the simplified active contour model, to obtain a fifth initial boundary position and a sixth initial boundary position, respectively;

smoothing the fifth initial boundary position and the sixth initial boundary position using a Savitzky-Golay filtering method, and taking the smoothed fifth initial boundary position and the smoothed sixth initial boundary position as a segmentation position of the boundary of retinal pigment epithelium-choroid and a segmentation position of the boundary of inner nuclear layer-outer plexiform layer, respectively.

6. The method for acquiring a retina structure from an optical coherence tomographic image according to claim 3, wherein determining a segmentation position of inner plexiform layer-inner nuclear layer according to the segmented position of inner nuclear layer-outer plexiform layer comprises:

initializing a boundary of inner plexiform layer-inner nuclear layer according to the segmented position of inner nuclear layer-outer plexiform layer;

refining the initialized boundary of inner plexiform layer-inner nuclear layer using the simplified active contour model, to obtain a seventh initial boundary position;

smoothing the seventh initial boundary position using the Savitzky-Golay filtering method, and taking the smoothed seventh initial boundary position as a segmentation position of the boundary of inner plexiform layer-inner nuclear layer.

7. The method for acquiring a retina structure from an optical coherence tomographic image according to claim 3, wherein determining a segmentation position of nerve fiber layer-ganglion cell layer according to the segmented position of inner plexiform layer-inner nuclear layer and the segmented position of the second layer boundary comprises:

initializing the boundary of nerve fiber layer-ganglion cell layer according to the segmented position of inner plexiform layer-inner nuclear layer and the segmented position of the first layer boundary;

refining the initialized boundary of nerve fiber layer-ganglion cell layer using the simplified active contour model, to obtain an eighth initial boundary position;

smoothing the eighth initial boundary position using a Savitzky-Golay filtering method, and taking the smoothed eighth initial boundary position as a segmentation position of the boundary of nerve fiber layer-ganglion cell layer.

8. A device, comprising:
a processor; and
a memory containing computer readable instructions which, when being executed, cause the processor to perform the method according to claim 1.

* * * * *